United States Patent
Moen et al.

(10) Patent No.: US 10,406,853 B2
(45) Date of Patent: Sep. 10, 2019

(54) MULTI-WIDTH DUAL WHEEL ARRANGEMENT FOR AN AGRICULTURAL MACHINE

(71) Applicant: CNH Industrial America LLC, New Holland, PA (US)

(72) Inventors: Richard A. Moen, Glenwood, MN (US); Bradley D. Hansen, Montevideo, MN (US); William A. Roach, Lake Lillian, MN (US)

(73) Assignee: CNH Industrial America LLC, New Holland, PA (US)

( * ) Notice: Subject to any disclaimer, the term of this patent is extended or adjusted under 35 U.S.C. 154(b) by 158 days.

(21) Appl. No.: 15/620,367

(22) Filed: Jun. 12, 2017

(65) Prior Publication Data

US 2018/0354296 A1  Dec. 13, 2018

(51) Int. Cl.
 *B60B 11/02* (2006.01)
 *B60B 3/16* (2006.01)
 *B60B 3/00* (2006.01)

(52) U.S. Cl.
 CPC .............. *B60B 11/02* (2013.01); *B60B 3/007* (2013.01); *B60B 3/16* (2013.01)

(58) Field of Classification Search
 CPC ......... B60B 11/02; B60B 11/06; B60B 11/10; B60B 3/007; B60B 3/16; B60B 23/12
 USPC .................... 301/35.628, 35.629, 40.2, 40.4
 See application file for complete search history.

(56) References Cited

U.S. PATENT DOCUMENTS

| | | | | |
|---|---|---|---|---|
| 1,297,243 | A | * | 3/1919 | Putnam .................... B60B 11/06 152/396 |
| 1,802,773 | A | * | 4/1931 | Nelson ..................... B60B 11/06 301/11.1 |
| 2,237,247 | A | * | 4/1941 | Brink ....................... B60B 11/06 301/105.1 |

(Continued)

FOREIGN PATENT DOCUMENTS

DE   202015105678 U1 * 12/2015   ............. B60B 11/02

OTHER PUBLICATIONS

University of Nebraska, EC96-780 Equipment Wheel Spacing for Ridge-Till and No-Till Row Crops, DigitalCommons@University of Nebraska-Lincoln, 1996, pp. 1-3, University of Nebraska-Lincoln, Lincoln, Nebraska, http://digitalcommons.unl.edu/extensionhist/694.

(Continued)

*Primary Examiner* — Kip T Kotter
(74) *Attorney, Agent, or Firm* — Rebecca L. Henkel; Rickard K. DeMille

(57) ABSTRACT

A multi-width dual wheel arrangement and method utilize a dual wheel spacer and a clamping disk for selectively mounting a dual wheel having a rim to a first wheel at a desired axial spacing of the dual wheel from the first wheel along a rolling axis of the dual and first wheels. The clamping ring is positioned outboard of the rim to clamp the rim between the clamping ring and the spacer for positioning the dual wheel at a first axial spacing from the first wheel along the rolling axis. The clamping ring is positioned inboard between the rim of the dual wheel and the dual wheel spacer for positioning the dual wheel at a second axial spacing from the first wheel. A third axial spacing is pro- (Continued)

vided by configuring the rim to have a convex surface that may be electively positioned facing toward or away from the first wheel.

20 Claims, 3 Drawing Sheets

(56) References Cited

U.S. PATENT DOCUMENTS

| | | | | |
|---|---|---|---|---|
| 2,467,482 | A * | 4/1949 | Hutchings | B60B 23/12 |
| | | | | 301/13.1 |
| 2,874,997 | A * | 2/1959 | Brink | B60B 11/06 |
| | | | | 301/13.1 |
| 3,039,825 | A * | 6/1962 | Clark | B60B 11/06 |
| | | | | 301/36.1 |
| 3,771,832 | A | 11/1973 | Sipovic et al. | |
| 3,847,441 | A * | 11/1974 | Morkoski | B60B 11/02 |
| | | | | 301/36.1 |
| 3,893,689 | A | 7/1975 | Verhoff | |
| 4,007,968 | A * | 2/1977 | Solis | B60B 11/02 |
| | | | | 301/38.1 |
| 4,135,765 | A | 1/1979 | Hardwicke | |
| 4,220,372 | A | 9/1980 | Johansen et al. | |
| 4,261,621 | A * | 4/1981 | Fox | B60B 11/02 |
| | | | | 301/35.628 |
| 4,290,654 | A | 9/1981 | Majkrzak et al. | |
| 4,427,237 | A | 1/1984 | Beegle | |
| 4,515,411 | A | 5/1985 | Taylor | |
| 4,822,108 | A | 4/1989 | Benham | |
| 5,005,913 | A | 4/1991 | Kittle et al. | |
| 6,250,722 | B1 * | 6/2001 | Radke | B60B 11/00 |
| | | | | 301/36.1 |
| 6,609,765 | B2 | 8/2003 | Radke et al. | |
| 9,227,464 | B2 | 1/2016 | Payne | |
| 2008/0054714 | A1 | 3/2008 | Morrow | |
| 2012/0256474 | A1 * | 10/2012 | Gorle | B60B 11/02 |
| | | | | 301/105.1 |
| 2014/0368025 | A1 | 12/2014 | Pellicano et al. | |
| 2015/0008722 | A1 | 1/2015 | Bride | |
| 2015/0123453 | A1 | 5/2015 | Benoit, Jr. | |
| 2016/0303897 | A1 * | 10/2016 | Niemczyk | B60B 11/02 |

OTHER PUBLICATIONS

Unverferth, Unverferth Wheel Products, Wheel Hub Extensions, Jan. 9, 2017, pp. 1-2, https://www-umequip.com/wheels/dual-and-triple/extension/.

* cited by examiner

MULTI-WIDTH DUAL WHEEL ARRANGEMENT FOR AN AGRICULTURAL MACHINE

FIELD OF THE INVENTION

This invention generally relates to providing dual wheels for a vehicle, and more particularly to providing a dual wheel arrangement that allows alternate spacing between a dual wheel and the wheel to which the dual wheel is attached.

BACKGROUND OF THE INVENTION

Dual wheels are commonly used to increase traction and/or reduce surface loading in comparison to the traction and surface loading that can be provided by a single wheel. For example, self-propelled agricultural machinery is commonly equipped with dual wheels to increase pulling capacity of the machine during certain agricultural tillage and planting operations. Dual wheels are also utilized in agricultural operations to reduce soil compaction that would be detrimental to crop growth and soil conservation.

In a self-propelled agricultural product applicator, for example, the applicator may be carrying thousands of pounds of liquid or dry fertilizers or chemicals to be dispensed onto the ground, in addition to the weight of the applicator. Equipping such an applicator with dual wheels may allow operation of the machine under soil conditions that would not be conducive to operation with an applicator not having dual wheels.

Optimal performance of agricultural pesticides and herbicides requires application of the chemicals within very narrow windows of opportunity. The addition of dual wheels, therefore, can substantially expand the usability of the applicator by allowing it to operate in a wider range of field conditions, thereby also enhancing performance and cost-effectiveness of the agricultural product.

Prior dual wheel arrangements typically allow for installation of the dual wheel at a fixed distance along the rolling axis from the first wheel of the dual wheel arrangement. If a different spacing is desired, a different dual wheel is typically required. For some dual wheel applications, it is desirable to have the capability for installing the dual wheel at more than one fixed distance from the first wheel. Crop rows in agricultural row cropping operations typically use a fixed row-to-row spacing, such as 30 inches, 22 inches or 20 inches, for example. Preferred row spacings vary dependent upon the type of crop being grown, and also geographically.

It is desirable, therefore, to provide an improved approach to providing dual wheels that allows the dual wheel of a dual wheel arrangement to be installed at more than one axial spacing along the rolling axis from a first wheel of the dual wheel arrangement, without resorting to the present approach of having a different specialized dual wheel or mounting arrangement for each different wheel spacing.

SUMMARY OF THE INVENTION

The invention provides a multi-width dual wheel arrangement and method that utilize a dual wheel spacer and a clamping ring for selectively mounting a dual wheel having a rim, to a first wheel at two or more desired axial spacings of the dual wheel from the first wheel along a rolling axis of the dual and first wheels. The clamping ring is positioned outboard of the rim to clamp the rim between the clamping ring and the spacer for positioning the dual wheel at a first axial spacing from the first wheel along the rolling axis. The clamping ring is positioned inboard between the rim of the dual wheel and the dual wheel spacer for positioning the dual wheel at a second axial spacing from the first wheel. In some forms of the invention, a third axial spacing is provided by configuring the rim to have a convex surface that may be electively positioned facing toward or away from the first wheel. In some forms of the invention, the dual wheel may be identical to the first wheel.

In some forms of the invention, the first, second and third axial spacings of the dual wheel may correspond to commonly used row widths of agricultural row cropping operations. For example, the first second and third axial spacings may substantially correspond to crop row spacings of 20 inches, 22 inches and 30 inches commonly used in North American agricultural operations.

In one form of the invention, a multi-width dual wheel arrangement is provided for attaching a dual wheel having a rim thereof to a first wheel having a plurality of mounting bolts for mounting the first wheel for rotation about a rolling axis of the first and dual wheels. The multi-width dual wheel arrangement includes a wheel spacer, a clamping ring and a plurality of dual wheel mounting bolts, configured for selectively securing the dual wheel to the first wheel at a first and a second axial spacing of the dual wheel from the first wheel along the rolling axis, with the second axial spacing being greater than the first axial spacing.

The spacer may have an axially extending body terminating at an inner end of the spacer in a first wheel bolting flange adapted for bolted engagement to the first wheel by the mounting bolts of the first wheel. The spacer may also have an outer end of the spacer terminating in a dual wheel bolting flange, adapted for bolted engagement of the rim of the dual wheel to the spacer, using the plurality of dual wheel mounting bolts.

The clamping ring may be adapted for attachment alternatively in an outboard or an inboard position with respect to the rim. The clamping ring may be adapted for attachment by the plurality of dual wheel mounting bolts in the outboard position with the rim of the dual wheel clamped between the clamping ring and the dual wheel bolting flange of the spacer, when attaching the dual wheel at the first axial spacing from the first wheel along the rolling axis. Alternatively, the clamping ring may be further adapted for attachment by the dual wheel mounting bolts alternatively in the inboard position, between the rim of the dual wheel and the dual wheel bolting flange of the spacer, when attaching the dual wheel at the second axial spacing from the first wheel along the rolling axis.

The mounting bolts may be configured to provide a desired axial stretch at a specified bolting torque. The rim of the dual wheel, the dual wheel bolting flange at the outer end of the dual wheel spacer, and the clamping ring may have respective axial thickness thereof selected such that their combined axial thicknesses of the rim and the dual wheel bolting flange provide the desired alternative first and a second axial spacing of the dual wheel from the first wheel along the rolling axis. The axial thickness of the clamping ring may also be configured to provide the desired axial stretch of the mounting bolts at the specified bolting torque with the clamping ring located in either the inboard or outboard position with respect to the rim of the dual wheel.

In some forms of a multi-width dual wheel spacing arrangement, according to the invention, the spacer and the clamping ring may include piloting features for engaging and centering the rim of the dual wheel about the rolling axis. In one form of such piloting, the dual wheel spacer may include a dual wheel bolting flange that defines an outwardly axially extending male pilot for engaging and centering the rim of the dual wheel about the rolling axis when the clamping ring is disposed in the outboard position of the clamping ring, and for engaging and centering the clamping ring when the clamping ring is disposed in the inboard position of the clamping ring. The clamping ring may define an outwardly axially extending male pilot adapted for engaging and centering the rim of the dual wheel about the rolling axis when the clamping ring is disposed in the inboard position of the clamping ring. And, the clamping ring may also define an axially inwardly extending male pilot adapted for engaging the axially outwardly extending male pilot of the spacer bolting flange, when the clamping ring is disposed in the inboard position of the clamping ring between the dual wheel rim and the dual wheel spacer, for centering the clamping ring about the rolling axis.

In some forms of a multi-width dual wheel spacing arrangement, according to the invention, the rim of the dual wheel is dished along the rolling axis to form a convex surface of the rim. The rim may also be configured for attachment with the convex surface alternatively facing toward, or away from the first wheel, in such a manner that, when the convex surface is facing the first wheel, the dished shape of the rim of the dual wheel results in the dual wheel being positioned at a third axial spacing from the first wheel. The first, second and third axial spacings of the dual wheel correspond to commonly used row widths of agricultural row cropping operations. For example, the first second and third axial spacings may be selected to substantially correspond to row spacings of 20 inches, 22 inches and 30 inches.

In some forms of a multi-width dual wheel spacing arrangement, according to the invention, the first wheel may define a primary direction of travel of the first wheel and for the dual wheel attached to the first wheel. The dual wheel may also be configured for preferential operation in the primary direction of travel when the dual wheel is attached to the first wheel with the convex surface facing away from the first wheel.

In some forms of the invention, having wheels configured for preferential operation in a primary direction of travel, the first wheel and the dual wheel may be adapted for installation on the right side of a vehicle having right and left first wheels. In such an arrangement, the first wheel and dual wheel on the right side of the vehicle may serve as a right first wheel and a right dual wheel. The right first wheel may be mounted by a plurality of right first wheel mounting bolts for mounting the right first wheel for rotation about a rolling axis of the right first wheel and the right dual wheel. In similar fashion, on the left side of the vehicle, the left first wheel may be mounted by a plurality of left first wheel mounting bolts for rotation about a rolling axis of the left first wheel and the left dual wheel.

The multi-width dual wheel spacing arrangement may include both a first spacing arrangement adapted for use on the right side of the vehicle, and a second spacing arrangement adapted for use on the left side of a vehicle. The first spacing arrangement may include a first spacer, first clamping ring and a first plurality of dual wheel mounting bolts, configured for selectively securing the right dual wheel to the right first wheel at the first and second axial spacings of the right dual wheel from the right first wheel along the right wheel rolling axis, in the manner described above, with the second axial spacing of the right dual wheel from the right first wheel being greater than the first axial spacing of the right dual wheel from the right first wheel. The second spacing arrangement may include a second wheel spacer, a second clamping ring and a second plurality of dual wheel mounting bolts. The second wheel spacer, a second clamping ring and a second plurality of dual wheel mounting bolts may be configured for selectively securing a left dual wheel having a rim thereof to the left first wheel at first and second axial spacings of the left dual wheel from the left right wheel along the left wheel rolling axis, in the manner described above, with the second axial spacing of the left dual wheel from the left first wheel being greater than the first axial spacing of the left dual wheel from the left first wheel.

The second dual wheel spacer, although oriented for use on the left side of the vehicle, may be identical to the first dual wheel spacer, except for the opposite orientation of the first spacer for use on the right side of the vehicle. As such, the second dual wheel spacer may have an axially extending body terminating at an inner end of the second spacer in a first wheel bolting flange adapted for bolted engagement to the left first wheel by the mounting bolts of the left first wheel. The second wheel spacer may also have an outer end of the spacer terminating in a left dual wheel bolting flange.

The second clamping ring may be identical to the first clamping ring, except for an opposite orientation along the rolling axis, and be adapted for attachment by the left dual wheel mounting bolts in an outboard position with the left dual wheel clamped between the clamping ring and the left dual wheel bolting flange of the second wheel spacer, to thereby attach the right left wheel at the first axial spacing from the left first wheel along the rolling axis of the left first and dual wheels. The second clamping ring may also be further adapted for attachment by the left dual wheel mounting bolts alternatively in an inboard position between the rim of the left dual wheel and the left dual wheel bolting flange of the second wheel spacer, to thereby attach the left dual wheel at the second axial spacing from the left first wheel along the left rolling axis of the left first and dual wheels.

In some forms of a multi-width dual wheel spacing arrangement, according to the invention, the rims of the right dual wheel and the left dual wheels may both be dished along their respective rolling axes to form convex surfaces of the rims. The right and left dual wheel rims may also be configured for attachment alternatively with the convex surface facing toward or away from the first wheels in such a manner that the dished shape of the rims of the right and left dual wheels result in the right and left dual wheels being positioned at a third axial spacing from the right and left first wheels.

In some forms of the invention, the right and left first wheels have a tread pattern or other features that define a primary direction of travel of the right and left first wheels and the right and left dual wheels attached respectively to the right and left first wheels. The dual wheels, in some forms of the invention, may also each be configured for preferential operation in the primary direction of travel when the right dual wheel is attached to the right first wheel with the convex surface of the rim of the right dual wheel facing away from the right first wheel and the left dual wheel is attached to the left first wheel with the convex surface of the rim of the left dual wheel facing away from the left first wheel.

In some forms of the invention, a multi-width dual wheel spacing arrangement having first and second spacing arrangements may be configured such that the right dual wheel is mountable to the second wheel spacer on the left side of the vehicle, in place of the left dual wheel, with the convex surface of the rim of the right dual wheel facing toward the left first wheel. The multi-width dual wheel spacing arrangement may be further configured such that the left dual wheel is mountable to the first wheel spacer on the right side of the vehicle, in place of the right dual wheel, with the convex surface of the rim of the left dual wheel facing toward the right first wheel. By moving the dual wheels to opposite sides of the machine in this fashion, the right and left dual wheels are maintained in their respective preferred primary direction of travel when the orientation of the convex surface of the rims of the right and left dual wheels is reversed from facing away from their respective right and left first wheels to facing toward their respective right and left first wheels, for positioning the dual wheels at their respective third axial spacings.

In some forms of the invention, the dual wheel spacer may have an axially extending substantially cylindrical body defining an interior of the spacer. The cylindrical body may terminate at an inner end of the spacer in a first wheel bolting flange extending into the interior of the cylindrical body, with the first wheel bolting flange being adapted for bolted engagement to the first wheel by the mounting bolts of the first wheel. The cylindrical body of the spacer may also have an outer end terminating in a dual wheel bolting flange extending into the interior of the cylindrical body of the spacer.

The invention may also take the form of a method for attaching one or more dual wheels to one or more first wheels, using a multi-width dual wheel attachment arrangement, according to the invention. A method, according to the invention may include attaching a dual wheel to a first wheel at either a first or a second axial spacing of the dual wheel from the first wheel along the rolling axis, with the second axial spacing being greater than the first axial spacing, using a multi-width dual wheel arrangement that includes a wheel spacer, a clamping ring and a plurality of dual wheel mounting bolts.

Some forms of a method, according to the invention, may include torquing the dual wheel mounting bolts to a specified bolting torque, where the components of the multi-width dual wheel attachment arrangement are configured such that a desired axial stretch of the dual wheel mounting bolts is achieved at the specified bolting torque with the clamping ring located in either the inboard or outboard position of the clamping ring with respect to a rim of the dual wheel being attached.

In some forms of a method for attaching a dual wheel to a first wheel, according to the invention, where the rim of the dual wheel is dished along the rolling axis to form a convex surface thereof and configured for attachment alternatively with the convex surface facing toward or away from the first wheel in such a manner that the dished shape of the rim of the dual wheel results in the dual wheel being positioned at a third axial spacing from the first wheel, the method may include selectively attaching the dual wheel with the convex surface of the dual wheel oriented to position the dual wheel at the third axial spacing from the first wheel. A method, according to the invention, may further include moving a left dual wheel to the right side of a vehicle and moving the right dual wheel to the left side of the vehicle, to thereby maintain orientation of the left and right dual wheels in their respective preferred primary direction of travel with the left and right dual wheels positioned at respective third axial spacings of the dual wheels from the first wheels.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 3-5 are properly construed as either a sectional view looking from the front toward the rear of a vehicle at a multi-width dual wheel attachment arrangement mounted on the right side of the vehicle, or alternatively as a sectional view looking from the rear toward the front of a vehicle at a sectional view multi-width dual wheel attachment arrangement mounted on the left side of the vehicle.

Figure 1:
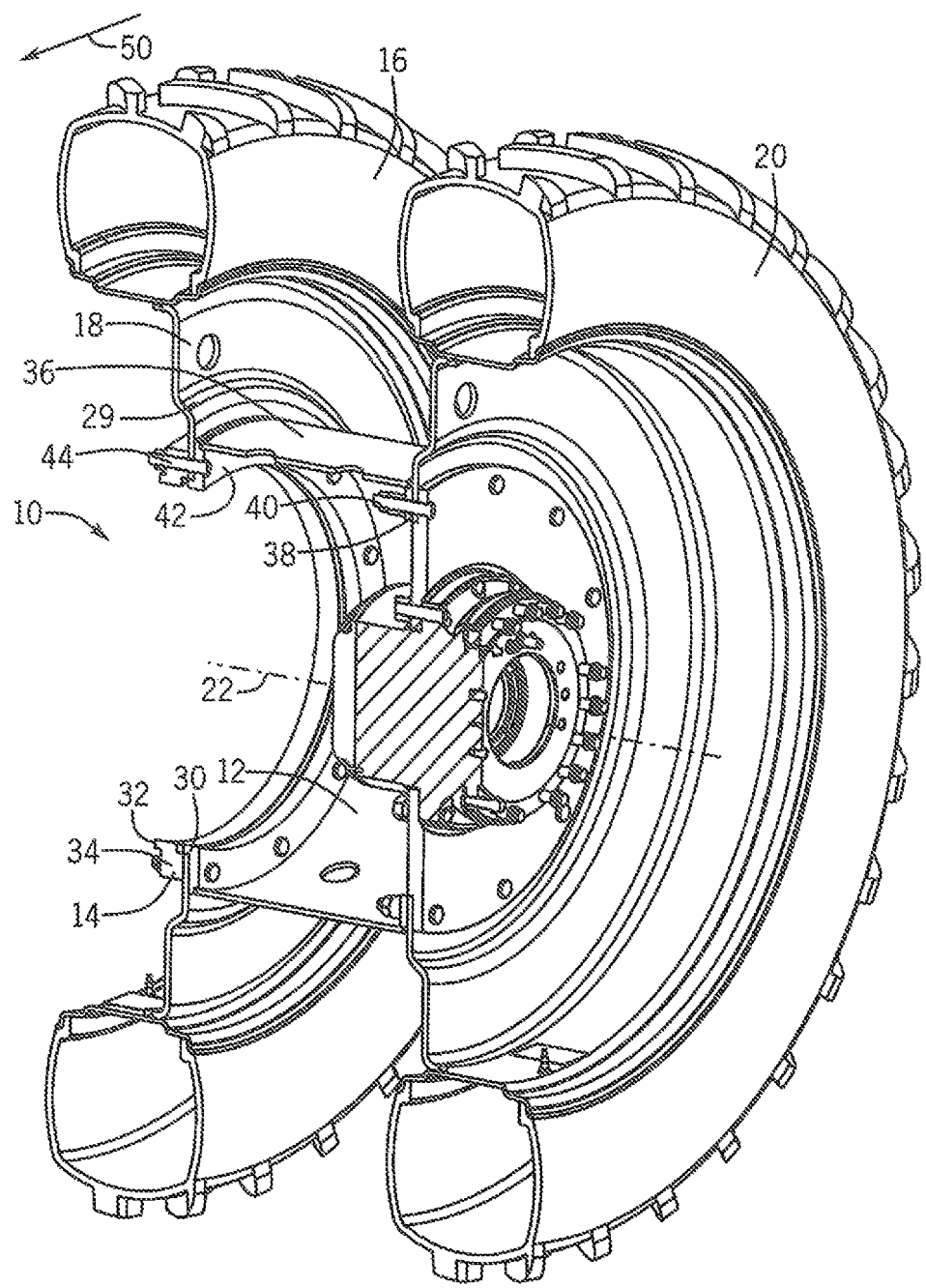
FIG. 1 is a partially cut-away, isometric view of an exemplary embodiment of a multi-width dual wheel attachment arrangement, according to the invention, attaching a dual wheel to a first wheel having lugged tires oriented for preferential operation on the right side of a machine or vehicle.

While the invention is described in connection with certain preferred embodiments, there is no intent to limit it to those embodiments. On the contrary, the intent is to cover all alternatives, modifications and equivalents as included within the spirit and scope of the invention.

DETAILED DESCRIPTION OF THE PREFERRED EMBODIMENTS

FIGS. 1-5 show a first exemplary embodiment of a multi-width dual wheel arrangement 10 that utilize a dual wheel spacer 12 and a clamping ring 14 for selectively mounting a dual wheel 16 having a rim 18, to a first wheel 20 at two or more desired axial spacings of the dual wheel 16 from the first wheel 20 along a rolling axis 22 of the dual and first wheels 16,20.

Figure 3:
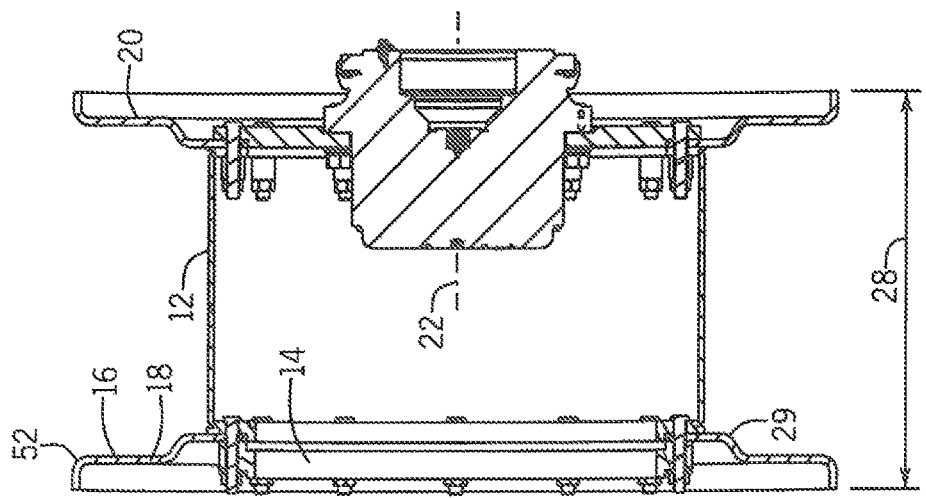
FIGS. 3-5 are dual use, orthographic, sectional views of the multi-width dual wheel attachment arrangement of FIG. 1, showing the manner of selectively attaching the dual wheel at alternative first, second and third spacings of the dual wheel with respect to the first wheel.

As shown in FIG. 3, the clamping ring 14 is positioned outboard of the rim 18 to clamp the rim 18 between the clamping ring 14 and the spacer 12 for positioning the dual wheel 16 at a first axial spacing 24 from the first wheel 20 along the rolling axis 22.

Figure 4:
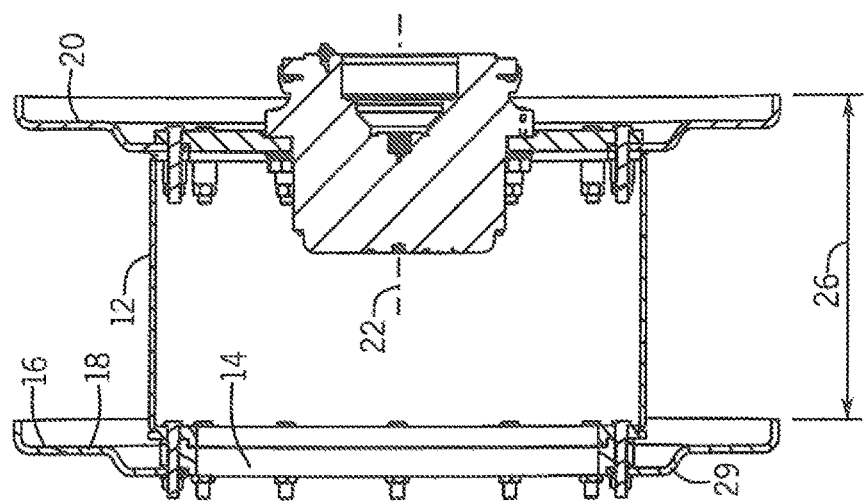

As shown in FIG. 4, the clamping ring 14 is alternatively positioned inboard between the rim 18 of the dual wheel 16 and the dual wheel spacer 12 for positioning the dual wheel 16 at a second axial spacing 26 from the first wheel 20.

Figure 5:
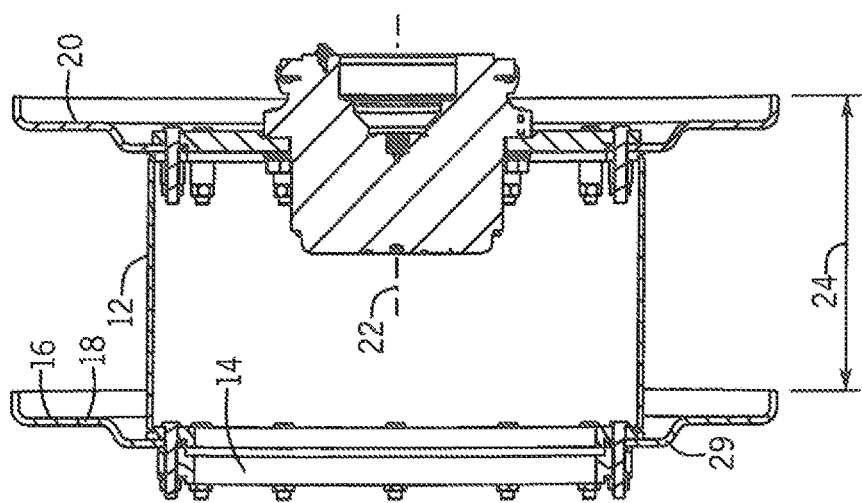

As shown in FIG. 5, a third axial spacing 28 of the dual wheel 16 from the first wheel 20 is provided by configuring the rim 18 to have a convex surface 29 that may be selectively positioned facing either toward or away from the first wheel 20. As will be understood from comparing FIGS. 3-5 to one another, the dual wheel 16 is mounted with the convex surface 29 facing away from the first wheel 20 to position the dual wheel 16 at the first and second axial positions 24,26, and is mounted with the convex surface 29 facing toward the first wheel 20 to position the dual wheel 16 at the third axial position 28 from the first wheel 20.

As indicated in FIGS. 1-5, in the exemplary embodiment of the multi-width dual wheel attachment arrangement, the dual wheel 16 is identical to the first wheel 20, thus eliminating the need for having specialized dual wheels to provide alternate wheel spacings. The first, second and third axial spacings 24,26,28 of the dual wheel 16 in the exemplary embodiment also correspond to crop row spacings of 20 inches, 22 inches and 30 inches, respectively, commonly used in North American agricultural operations. Practice of the invention is not limited to these wheel spacings, however.

As shown in FIGS. 1-5, In the exemplary embodiment of the multi-width dual wheel spacing arrangement 10, the spacer 12 and clamping ring 14 include piloting features 30,32,34 for engaging and centering the rim 18 of the dual wheel 16 about the rolling axis 22.

Figure 2:
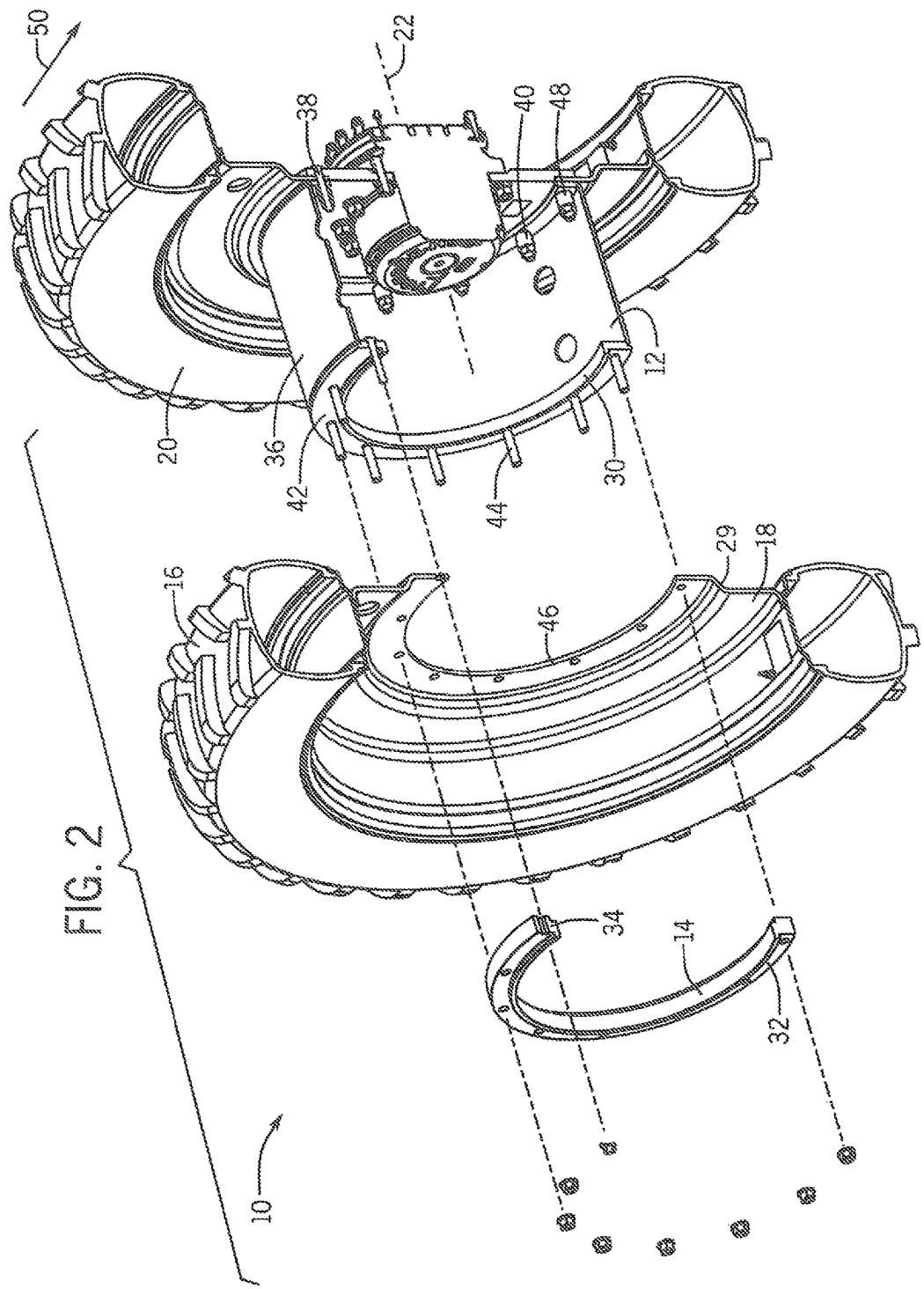
FIG. 2 is an exploded, partially cut-away, isometric view of the multi-width dual wheel attachment arrangement of FIG. 1, viewed from an opposite angle with respect to FIG. 1.

As best seen in FIG. 2, the spacer 12 of the exemplary embodiment 10 has a generally cylindrical axially extending body 36, terminating at an inner end of the spacer 12 in a first wheel bolting flange 38 adapted for bolted engagement to the first wheel 20 by the mounting bolts 40 of the first wheel 20. The outer end of the spacer 12 terminates in a dual wheel bolting flange 42, adapted for bolted engagement of the rim 18 of the dual wheel 16 to the spacer 12, using a plurality of dual wheel mounting bolts 44.

The dual wheel spacer 12 defines an annular shaped, outwardly axially extending, first male pilot 30 for engaging a concentric hole 46 in the center of the rim 18, to thereby center the rim 18 of the dual wheel 16 about the rolling axis 22 when the clamping ring 14 is disposed in the outboard position of the clamping ring 14 in the manner shown in FIGS. 1-2, 3 and 5. The first male pilot 30 of the spacer 12 is also configured for engaging and centering the clamping ring 14, when the clamping ring 14 is disposed in the inboard position of the clamping ring in the manner shown in FIG. 4 and described in more detail below.

The clamping ring 14 defines an annular shaped, outwardly axially extending, second male pilot 32 that is adapted for engaging the hole 46 in the rim 18 to center the rim 18 of the dual wheel 16 about the rolling axis 22 when the clamping ring 14 is disposed in the inboard position of the clamping ring 14, as shown in FIG. 4. The clamping ring 14 also defines an axially inwardly extending, annular shaped, third male pilot 34 that is adapted for engaging the axially outwardly extending first male pilot 30 of the spacer bolting flange 42, when the clamping ring 14 is disposed in the inboard position of the clamping ring 14 between the dual wheel rim 18 and the dual wheel spacer 12, for centering the clamping ring 14 about the rolling axis 22.

The inwardly extending third male pilot 34 has an inner periphery that is sized to substantially match the diameter of the central hole 46 in the rim 18 of the dual wheel, and also, therefore, to closely match the outer diameter of the first male pilot 30 extending from the bolting flange 42 at outboard end of the spacer 12. By virtue of these configurations, when the clamping ring 14 is positioned between the rim 18 and the spacer 12, the outer periphery of first pilot 30 on the outer end of the spacer 12 engages the inner periphery of the third pilot 34 on the inboard side of the clamping ring 14, and the outer periphery of second pilot 32 on the outboard side of the clamping ring 14 engages the hole 46 in the rim 18 to center the clamping ring 14 and the dual wheel 16 about the rolling axis 22.

In the exemplary embodiment of the multi-width dual wheel mounting arrangement 10, the dual wheel mounting bolts 44 are configured to provide a desired axial stretch at a specified bolting torque. The rim 18 of the dual wheel 16, the dual wheel bolting flange 42 at the outer end of the dual wheel spacer 12, and the clamping ring 14 have respective axial thicknesses thereof selected such that their combined axial thicknesses provide the desired axial stretch at the specified bolting torque, regardless of which of the first, second or third axial spacing of the dual wheel 16 from the first wheel 20 along the rolling axis 22 is selected, without resorting to individual bolt spacers 48 of the type shown in FIG. 2, thereby simplifying the dual wheel system 10. Stated another way, the axial thickness of the clamping ring 14 is configured to provide the desired axial stretch of the mounting bolts 44 at the specified bolting torque with the clamping ring 14 located in either its inboard or outboard position with respect to the rim 18 of the dual wheel 16.

Those having skill in the art will recognize that the description of the exemplary embodiment thus far applies, strictly speaking, to embodiments in which the dual wheel 16 has a tread pattern that is not configured for preferential operation in a primary direction of travel, such as a circumferentially ribbed or turf tire pattern, for example. For such bi-directional tread patterns, a dual wheel mounted with the concave portion 29 facing away from the first wheel 20, to position the dual wheel 16 in either first or second axial spacings 24, 24, may simply be inverted and re-mounted with the concave portion 29 facing toward the first wheel 20 to position the dual wheel 16 in the third axial spacing from the first wheel 20.

Where the dual wheel 16 is equipped with directionally specific tires, such as the lugged tires shown on the dual wheel 16 in FIGS. 1 and 2, having a tread pattern that defines a primary direction of operational travel 50 of the first wheel 20 and the dual wheel 16 attached to the first wheel 20, an additional step is necessary in changing the dual wheel 16 from an axial spacing with the convex portion 29 of the rim 18 facing away from the first wheel 20 to a position with the convex portion 29 facing toward the first wheel 20. Instead of merely inverting the dual wheel 16, the tire having the unidirectional tread pattern will need to be removed and reversed on the rim 18 to maintain the preferred direction of travel, or the dual wheel would need to be replaced with a second dual wheel 52 having the tire mounted with the tread properly oriented in the desired direction of travel 50, in the manner indicated in FIG. 5. In practicing the invention, it is contemplated that the need for removing and reversing tires, or having a spare dual wheel 52 with the tire mounted in the opposite direction is alleviated by simply moving the dual wheel 16 from a first multi-width dual wheel arrangement 10 on the right side of a vehicle, as depicted in FIGS. 3-5 when viewed from the front of the vehicle, to a second multi-width dual wheel arrangement 10, the right side of the vehicle, as depicted in FIGS. 3-5 when viewed from the rear of the vehicle, and vice versa, when it is desired to use a dual wheel spacing that would require the direction of the convex portion 29 of the rim of the dual wheel 16 be reversed with respect to the first wheel 20.

From the foregoing, those having skill in the art will readily recognize that the present invention provides a number of significant and beneficial advances and advantages over prior approaches to attaching dual wheels to agricultural machines.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known for carrying out the invention. Variations of those preferred embodiments may become apparent to those of ordinary skill in the art upon reading the foregoing description. It is anticipated that skilled artisans may employ such variations as appropriate, and further anticipated that the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A multi-width dual wheel arrangement, for attaching a dual wheel having a rim thereof to a first wheel having a plurality of mounting bolts for mounting the first wheel for rotation about a rolling axis of the first and dual wheels, the arrangement comprising a wheel spacer, a clamping ring and a plurality of dual wheel mounting bolts, configured for selectively securing the dual wheel to the first wheel at a first and a second axial spacing of the dual wheel from the first wheel along the rolling axis, with the second axial spacing being greater than the first axial spacing:

the spacer having an axially extending body terminating at an inner end of the spacer in a first wheel bolting flange adapted for bolted engagement to the first wheel by the mounting bolts of the first wheel, the spacer also having an outer end thereof terminating in a dual wheel bolting flange;

the clamping ring being adapted for attachment by the plurality of dual wheel mounting bolts in an outboard position with the rim of the dual wheel clamped between the clamping ring and the dual wheel bolting flange of the spacer, to thereby attach the dual wheel at the first axial spacing from the first wheel along the rolling axis; and the clamping ring being further adapted for attachment by the dual wheel mounting bolts alternatively in an inboard position between the rim of the dual wheel and the dual wheel bolting flange of the spacer, to thereby attach the dual wheel at the second axial spacing from the first wheel along the rolling axis.

2. The multi-width dual wheel spacing arrangement of claim 1, wherein the spacer and clamping ring include piloting features for engaging and centering the rim of the dual wheel about the rolling axis.

3. The multi-width dual wheel spacing arrangement of claim 2, wherein:

the bolting flange of the dual wheel spacer defines an outwardly axially extending male pilot for engaging and centering the rim of the dual wheel about the rolling axis when the clamping ring is disposed in the outboard position of the clamping ring, and for engaging and centering the clamping ring when the clamping ring is disposed in the inboard position of the clamping ring;

the clamping ring defines an outwardly axially extending male pilot adapted for engaging and centering the rim of the dual wheel about the rolling axis when the clamping ring is disposed in the inboard position of the clamping ring; and the clamping ring also defines an axially inwardly extending male pilot adapted for engaging the axially outwardly extending male pilot of the spacer bolting flange, when the clamping ring is disposed in the inboard position of the clamping ring between the dual wheel rim and the dual wheel spacer, for centering the clamping ring about the rolling axis.

4. The multi-width dual wheel spacing arrangement of claim 1, wherein:

the mounting bolts have a desired axial stretch at a specified bolting torque;

the rim of the dual wheel and the dual wheel bolting flange of the spacer have axial thicknesses thereof;

the clamping ring has an axial thickness thereof that, in combination with the axial thicknesses of the rim and the dual wheel bolting flange provide a desired alternative first axial spacing and an alternative second axial spacing of the dual wheel from the first wheel along the rolling axis; and the axial thickness of the clamping ring is configured to provide the desired axial stretch of the mounting bolts at the specified bolting torque with the clamping ring located in either the inboard or outboard position thereof.

5. The multi-width dual wheel spacing arrangement of claim 1, wherein the rim of the dual wheel is dished along the rolling axis to form a convex surface thereof and configured for attachment alternatively with the convex surface facing toward or away from the first wheel in such a manner that the dished shape of the rim of the dual wheel results in the dual wheel being positioned at a third axial spacing from the first wheel when the convex surface is oriented toward the first wheel.

6. The multi-width dual wheel spacing arrangement of claim 5, wherein:

the first wheel defines a primary direction of travel of the first wheel and the dual wheel attached thereto; and the dual wheel is configured for preferential operation in the primary direction of travel when the dual wheel is attached to the first wheel with the convex surface facing away from the first wheel.

7. The multi-width dual wheel spacing arrangement of claim 5, wherein:

the first wheel and the dual wheel are included in a first dual wheel spacing arrangement adapted for installation on the right side of a vehicle having right and left first wheels as the right first wheel and a right dual wheel;

the right first wheel being mounted by a plurality of right first wheel mounting bolts for mounting the right first wheel for rotation about a rolling axis of the right first and right dual wheels, and the left first wheel being mounted by a plurality of right first wheel mounting bolts for mounting the right first wheel for rotation about a rolling axis of the right first and right dual wheels;

the spacer, clamping ring and plurality of dual wheel mounting bolts are respectively a first spacer, first clamping ring and a first plurality of dual wheel mounting bolts, configured for selectively securing the right dual wheel to the right first wheel at the first and second axial spacings of the right dual wheel from the right wheel along the right rolling axis, with the second axial spacing of the right dual wheel from the right first wheel being greater than the first axial spacing of the right dual wheel from the right first wheel; and the spacing arrangement further includes a second wheel spacer, a second clamping ring and a second plurality of dual wheel mounting bolts, configured for selectively securing a left dual wheel having a rim thereof to the left first wheel at first and second axial spacings of the left dual wheel from the left first wheel along the left wheel rolling axis, with the second axial spacing of the left dual wheel from the left first wheel being greater than the first axial spacing of the left dual wheel from the left first wheel;

the second wheel spacer being identical to the first wheel spacer, having an axially extending body terminating at an inner end of the second spacer in a first wheel bolting flange adapted for bolted engagement to the left first wheel by the mounting bolts of the left first wheel, the second wheel spacer also having an outer end thereof terminating in a left dual wheel bolting flange;

the second clamping ring being identical to the first clamping ring and adapted for attachment by the left dual wheel mounting bolts in an outboard position with the rim of the left dual wheel clamped between the clamping ring and the left dual wheel bolting flange of the second wheel spacer, to thereby attach the left dual wheel at the first axial spacing from the left first wheel along the rolling axis;

the second clamping ring being further adapted for attachment by the left dual wheel mounting bolts alternatively in an inboard position between the rim of the left dual wheel and the left dual wheel bolting flange of the second wheel spacer, to thereby attach the left dual wheel at the second axial spacing from the left first wheel along the right rolling axis of the left first and dual wheels.

8. The multi-width dual wheel spacing arrangement of claim 7, wherein the rims of the right dual wheel and left dual wheel are dished along the rolling axis to form a convex surface thereof and are configured for attachment alternatively with the convex surface facing toward or away from the first wheel in such a manner that the dished shape of the rims of the right and left dual wheels results in the right and left dual wheels being positioned at a third axial spacing from the right and left first wheels.

9. The multi-width dual wheel spacing arrangement of claim 8, wherein:

the right and left first wheels define a primary direction of travel of the right and left first wheels and the right and left dual wheels attached respectively thereto; and the dual wheels are each configured for preferential operation in the primary direction of travel when the right dual wheel is attached to the right first wheel with the convex surface of the rim of the right dual wheel facing away from the right first wheel and the left dual wheel is attached to the left first wheel with the convex surface of the rim of the left dual wheel facing away from the left first wheel; and the multi-width dual wheel spacing arrangement is further configured such that the right dual wheel is mountable to the second wheel spacer with the convex surface of the rim of the right dual wheel facing toward the left first wheel, and such that the left dual wheel is mountable to the first wheel spacer with the convex surface of the rim of the left dual wheel facing toward the right first wheel, to thereby maintain orientation of the right and left dual wheels in their respective preferred primary direction of travel when the orientation of the convex surface of the rims of the right and left dual wheels is changed from facing away from their respective right and left first wheels to facing toward the left and right first wheels respectively to position the dual wheels at their respective third axial spacings.

10. A multi-width dual wheel arrangement, for attaching a dual wheel having a rim thereof, to a first wheel having a plurality of mounting bolts for mounting the first wheel for rotation about a rolling axis of the first and dual wheels, the arrangement comprising a wheel spacer, a clamping ring and a plurality of dual wheel mounting bolts, configured for selectively securing the dual wheel to the first wheel at a first and a second axial spacing of the dual wheel from the first wheel along the rolling axis, with the second axial spacing being greater than the first axial spacing:

the spacer having an axially extending substantially cylindrical body defining an interior thereof, the cylindrical body terminating at an inner end of the spacer in a first wheel bolting flange extending into the interior of the cylindrical body and adapted for bolted engagement to the first wheel by the mounting bolts of the first wheel, the cylindrical body of the spacer also having an outer end thereof terminating in a dual wheel bolting flange extending into the interior of the cylindrical body of the spacer;

the clamping ring being adapted for attachment by the dual wheel mounting bolts in an outboard position with the rim of the dual wheel clamped between the clamping ring and the dual wheel bolting flange of the spacer, to thereby attach the dual wheel at the first axial spacing from the first wheel along the rolling axis;

the clamping ring being further adapted for attachment by the dual wheel mounting bolts alternatively in an inboard position between the rim of the dual wheel and the dual wheel bolting flange of the spacer, to thereby attach the dual wheel at the second axial spacing from the first wheel along the rolling axis; and the spacer and clamping ring include piloting features for engaging and centering the rim of the dual wheel about the rolling axis.

11. The multi-width dual wheel arrangement of claim 10, wherein:

the dual wheel bolting flange defines an outwardly axially extending male pilot for engaging and centering the rim of the dual wheel about the rolling axis when the clamping ring is disposed in the outboard position of the clamping ring, and for engaging and centering the clamping ring when the clamping ring is disposed in the inboard position of the clamping ring;

the clamping ring defines an outwardly axially extending male pilot adapted for engaging and centering the rim of the dual wheel about the rolling axis when the clamping ring is disposed in the inboard position of the clamping ring; and the clamping ring also defines an axially inwardly extending male pilot adapted for engaging the axially outwardly extending male pilot of the spacer bolting flange, when the clamping ring is disposed in the inboard position of the clamping ring between the dual wheel rim and the dual wheel spacer, for centering the clamping ring about the rolling axis.

12. The multi-width dual wheel spacing arrangement of claim 10, wherein the rim of the dual wheel is dished along the rolling axis to form a convex surface thereof and configured for attachment alternatively with the convex surface facing toward or away from the first wheel in such a manner that the dished shape of the rim of the dual wheel results in the dual wheel being positioned at a third axial spacing from the first wheel.

13. The multi-width dual wheel spacing arrangement of claim 12, wherein:
the first wheel defines a primary direction of travel of the first wheel and the dual wheel attached thereto; and
the dual wheel is configured for preferential operation in the primary direction of travel when the dual wheel is attached to the first wheel with the convex surface facing away from the first wheel.

14. The multi-width dual wheel spacing arrangement of claim 12, wherein:
the first wheel and the dual wheel are adapted for installation on the right side of a vehicle having right and left first wheels as the right first wheel and a right dual wheel, with the right first wheel being mounted by a plurality of right first wheel mounting bolts for mounting the right first wheel for rotation about a rolling axis of the right first and right dual wheels, and the left first wheel being mounted by a plurality of left first wheel mounting bolts for mounting the left first wheel for rotation about a rolling axis of the left first and left dual wheels;
the spacer, clamping ring and plurality of dual wheel mounting bolts are respectively a first spacer, first clamping ring and a first plurality of dual wheel mounting bolts, configured for selectively securing the right dual wheel to the right first wheel at the first and second axial spacings of the right dual wheel from the right right wheel along the rolling axis, with the second axial spacing of the right dual wheel from the right first wheel being greater than the first axial spacing of the right dual wheel from the right first wheel; and
the spacing arrangement further includes a second wheel spacer, a second clamping ring and a second plurality of dual wheel mounting bolts, configured for selectively securing a left dual wheel having a rim thereof to the left first wheel at first and second axial spacings of the left dual wheel from the left right wheel along the left wheel rolling axis, with the second axial spacing of the left dual wheel from the left first wheel being greater than the first axial spacing of the left dual wheel from the left first wheel;
the second wheel spacer being identical to the first wheel spacer, having an axially extending body terminating at an inner end of the second spacer in a first wheel bolting flange adapted for bolted engagement to the left first wheel by the mounting bolts of the left first wheel, the second wheel spacer also having an outer end thereof terminating in a left dual wheel bolting flange;
the second clamping ring being identical to the first clamping ring and adapted for attachment by the left dual wheel mounting bolts in an outboard position with the rim of the left dual wheel clamped between the clamping ring and the left dual wheel bolting flange of the second wheel spacer, to thereby attach the left dual wheel at the first axial spacing from the left first wheel along the rolling axis;
the second clamping ring being further adapted for attachment by the left dual wheel mounting bolts alternatively in an inboard position between the rim of the left dual wheel and the left dual wheel bolting flange of the second wheel spacer, to thereby attach the left dual wheel at the second axial spacing from the left first wheel along the left rolling axis of the left first and dual wheels.

15. The multi-width dual wheel spacing arrangement of claim 14, wherein the rims of the right dual wheel and the left dual wheel are respectively dished along the right and left rolling axes to form convex surfaces thereof, and are configured for attachment alternatively with the convex surface facing toward or away from the first wheel in such a manner that the dished shape of the rim of the right and left dual wheels results in the right and left dual wheels being positioned at a third axial spacing from the right and left first wheels.

16. The multi-width dual wheel spacing arrangement of claim 15, wherein:
the right and left first wheels define a primary direction of travel of the right and left first wheels and the right and left dual wheels attached respectively thereto; and
the dual wheels are each configured for preferential operation in the primary direction of travel when the right dual wheel is attached to the right first wheel with the convex surface of the rim of the right dual wheel facing away from the right first wheel and the left dual wheel is attached to the left first wheel with the convex surface of the rim of the left dual wheel facing away from the left first wheel; and
the multi-width dual wheel spacing arrangement is further configured such that the right dual wheel is mountable to the second wheel spacer with the convex surface of the rim of the right dual wheel facing toward the left first wheel, and such that the left dual wheel is mountable to the first wheel spacer with the convex surface of the rim of the left dual wheel facing toward the right first wheel, to thereby maintain orientation of the right and left dual wheels in their respective preferred primary direction of travel when the orientation of the convex surface of the rims of the right and left dual wheels is changed from facing away from their respective right and left first wheels to facing toward the left and right first wheels respectively to position the dual wheels at their respective third axial spacings.

17. A method for attaching a dual wheel having a rim thereof, to a first wheel having a plurality of mounting bolts for mounting the first wheel for rotation about a rolling axis of the first and dual wheels, with the dual wheel selectively disposed at a desired axial distance from the first wheel, the method comprising:
attaching the dual wheel to the first wheel using a multi-width dual wheel arrangement, the arrangement including a wheel spacer, a clamping ring and a plurality of dual wheel mounting bolts, configured for selectively securing the dual wheel to the first wheel at a first axial spacing and a second axial spacing of the dual wheel from the first wheel along the rolling axis, with the second axial spacing being greater than the first axial spacing:
the spacer having an axially extending body terminating at an inner end of the spacer in a first wheel bolting flange adapted for bolted engagement to the first wheel by the mounting bolts of the first wheel, the spacer also having an outer end thereof terminating in a dual wheel bolting flange;
the clamping ring being adapted for attachment by the dual wheel mounting bolts in an outboard position with the rim of the dual wheel clamped between the clamping ring and the dual wheel bolting flange of the spacer, to thereby attach the dual wheel at the first axial spacing from the first wheel along the rolling axis; and the clamping ring being further adapted for attachment by the dual wheel mounting bolts alternatively in an inboard position between the rim of the dual wheel and the dual wheel bolting flange of the spacer, to thereby attach the dual wheel at the second axial spacing from the first wheel along the rolling axis.

18. The method for attaching a dual wheel to a first wheel, according to claim 17, wherein:

the mounting bolts have a desired axial stretch at a specified bolting torque;

the rim of the dual wheel and the dual wheel bolting flange of the spacer have axial thicknesses thereof;

the clamping ring has an axial length thereof that, in combination with the axial thicknesses of the rim and the dual wheel bolting flange provide a desired alternative first axial spacing and an alternative second axial spacing of the dual wheel from the first wheel along the rolling axis; and the axial length of the clamping ring is configured to provide the desired axial stretch of the dual wheel mounting bolts at the specified bolting torque with the clamping ring located in either the inboard or outboard position thereof; and the method further includes torquing the mounting bolts to the specified bolting torque.

19. The method for attaching a dual wheel to a first wheel, according to claim 17, wherein:

the rim of the dual wheel is dished along the rolling axis to form a convex surface thereof and configured for attachment alternatively with the convex surface facing toward or away from the first wheel in such a manner that the dished shape of the rim of the dual wheel results in the dual wheel being positioned at a third axial spacing from the first wheel; and the method further includes selectively attaching the dual wheel with the convex surface of the dual wheel oriented to position the dual wheel at the third axial spacing from the first wheel.

20. The method of claim 19, wherein:

the first wheel and the dual wheel are adapted for installation on the right side of a vehicle having right and left first wheels as the right first wheel and a right dual wheel, with the right first wheel being mounted by a plurality of right first wheel mounting bolts for mounting the right first wheel for rotation about a rolling axis of the right first and right dual wheels, and the left first wheel is mounted by a plurality of left first wheel mounting bolts for mounting the left first wheel for rotation about a rolling axis of the left first and left dual wheels;

the spacer, clamping ring and plurality of dual wheel mounting bolts are respectively a first spacer, first clamping ring and a first plurality of dual wheel mounting bolts, configured for selectively securing the right dual wheel to the right first wheel at the first and second axial spacings of the right dual wheel from the right right wheel along the rolling axis, with the second axial spacing of the right dual wheel from the right first wheel being greater than the first axial spacing of the right dual wheel from the right first wheel; and the spacing arrangement further includes a second wheel spacer, a second clamping ring and a second plurality of dual wheel mounting bolts, configured for selectively securing a left dual wheel having a rim thereof to the left first wheel at first and second axial spacings of the left dual wheel from the left right wheel along the left wheel rolling axis, with the second axial spacing of the left dual wheel from the left first wheel being greater than the first axial spacing of the left dual wheel from the left first wheel;

the second wheel spacer being identical to the first wheel spacer, having an axially extending body terminating at an inner end of the second spacer in a first wheel bolting flange adapted for bolted engagement to the left first wheel by the mounting bolts of the left first wheel, the second wheel spacer also having an outer end thereof terminating in a left dual wheel bolting flange;

the second clamping ring being identical to the first clamping ring and adapted for attachment by the left dual wheel mounting bolts in an outboard position with the rim of the left dual wheel clamped between the clamping ring and the left dual wheel bolting flange of the second wheel spacer, to thereby attach the left dual wheel at the first axial spacing from the left first wheel along the rolling axis;

the second clamping ring being further adapted for attachment by the left dual wheel mounting bolts alternatively in an inboard position between the rim of the left dual wheel and the left dual wheel bolting flange of the second wheel spacer, to thereby attach the left dual wheel at the second axial spacing from the left first wheel along the left rolling axis of the left first and dual wheels;

the rims of the right dual wheel and the left dual wheel are dished along the right rolling axis to form respective convex surfaces thereof and are configured for attachment alternatively with the convex surface facing toward or away from the first wheel in such a manner that the dished shape of the rims of the right and left dual wheels result in the right and left dual wheels being positioned at a third axial spacing from the right and left first wheels;

the right and left first wheels define a primary direction of travel of the right and left first wheels and the right and left dual wheels attached respectively thereto;

the dual wheels are each configured for preferential operation in the primary direction of travel when the right dual wheel is attached to the right first wheel with the convex surface of the rim of the right dual wheel facing away from the right first wheel and the left dual wheel is attached to the left first wheel with the convex surface of the rim of the left dual wheel facing away from the left first wheel;

the multi-width dual wheel spacing arrangement is further configured such that the right dual wheel is mountable to the second wheel spacer with the convex surface of the rim of the right dual wheel facing toward the left first wheel, and such that the left dual wheel is mountable to the first wheel spacer with the convex surface of the rim of the left dual wheel facing toward the right first wheel, to thereby maintain orientation of the right and left dual wheels in their respective preferred primary direction of travel when the orientation of the convex surface of the rims of the right and left dual wheels is changed from facing away from their respective right and left first wheels to facing toward the left and right first wheels to position the dual wheels at their respective third axial spacings; and the method further includes mounting the right dual wheel to the second wheel spacer with the convex surface of the rim of the right dual wheel facing toward the left first wheel, and mounting the left dual wheel to the first wheel spacer with the convex surface of the rim of the left dual wheel facing toward the right first wheel, to thereby maintain orientation of the right and left dual wheels in their respective preferred primary direction of travel with the right and left dual wheels positioned at their respective third axial spacings.

* * * * *